(12) United States Patent
Dasdan et al.

(10) Patent No.: US 10,521,829 B2
(45) Date of Patent: Dec. 31, 2019

(54) DYNAMIC ORDERING OF ONLINE ADVERTISEMENT SOFTWARE STEPS

(71) Applicant: Amobee, Inc., Redwood City, CA (US)

(72) Inventors: Ali Dasdan, San Jose, CA (US); Christos Koufogiannakis, Menlo Park, CA (US)

(73) Assignee: Amobee, Inc., Redwood City, CA (US)

( * ) Notice: Subject to any disclaimer, the term of this patent is extended or adjusted under 35 U.S.C. 154(b) by 382 days.

(21) Appl. No.: 15/299,350

(22) Filed: Oct. 20, 2016

(65) Prior Publication Data

US 2017/0039603 A1     Feb. 9, 2017

Related U.S. Application Data

(63) Continuation of application No. 14/097,892, filed on Dec. 5, 2013, now abandoned.

(51) Int. Cl.
*G06Q 30/02* (2012.01)
*G06F 8/41* (2018.01)

(52) U.S. Cl.
CPC ....... *G06Q 30/0275* (2013.01); *G06F 8/4434* (2013.01); *G06F 8/4441* (2013.01); *G06Q 30/0277* (2013.01)

(58) Field of Classification Search
CPC .............. G06Q 30/02; G06Q 30/0275; G06Q 30/0277; G06F 8/4434; G06F 8/4441
See application file for complete search history.

(56) References Cited

U.S. PATENT DOCUMENTS

| 6,285,987 B1 * | 9/2001 | Roth ............... G06Q 30/02 |
| | | 705/14.66 |
| 7,027,962 B2 * | 4/2006 | Hayo ............... H03H 17/0294 |
| | | 702/197 |
| 8,655,695 B1 | 2/2014 | Qu et al. |

(Continued)

OTHER PUBLICATIONS

IP.com, "Optimized Spot Inventory Acquisition and Allocation" (published in The IP.com Prior Art Database, Aug. 29, 2013 (Year: 2013).*

(Continued)

*Primary Examiner* — James M Detweiler
*Assistant Examiner* — Patrick Kim
(74) *Attorney, Agent, or Firm* — Kwan & Olynick LLP

(57) ABSTRACT

At a bid determination platform, an initial sequence having an initial order of software steps for filtering advertisements in response to receiving an advertisement bid request is selected. Until a trigger event occurs, the initial sequence of software steps is implemented in the initial order in response to receiving advertisement bid requests. Implementing the initial sequence comprises automatically tracking a failure (or success) metric and resource requirement metric for each of the software steps. After the trigger event occurs, a first optimum sequence of the software steps is automatically selected in a first optimum order so as to optimize a total resource usage for execution of the software steps. Selecting the first optimum sequence of the software steps in the first optimum order is based on the tracked failure (or success) metric and resource requirement metric for each of the software steps during implementation of the initial sequence.

18 Claims, 6 Drawing Sheets

(56) References Cited

U.S. PATENT DOCUMENTS

| | | | |
|---|---|---|---|
| 2002/0184557 A1* | 12/2002 | Hughes | G11C 29/4401 714/6.13 |
| 2006/0224447 A1 | 10/2006 | Koningstein | |
| 2009/0276766 A1 | 11/2009 | Song et al. | |
| 2010/0042930 A1 | 2/2010 | Pritchard et al. | |
| 2012/0079494 A1* | 3/2012 | Sandstrom | G06F 9/4881 718/104 |
| 2012/0096320 A1 | 4/2012 | Caffrey | |
| 2013/0151332 A1 | 6/2013 | Yan et al. | |
| 2013/0325589 A1 | 12/2013 | Jordan | |
| 2015/0026434 A1* | 1/2015 | Basant | G06F 9/546 712/205 |
| 2015/0161678 A1 | 6/2015 | Dasdan et al. | |
| 2015/0170221 A1 | 6/2015 | Shah | |

OTHER PUBLICATIONS

"U.S. Appl. No. 14/097,892, Examiner Interview Summary dated May 15, 2014", 3 pgs.

"U.S. Appl. No. 14/097,892, Examiner Interview Summary dated Sep. 24, 2015", 3 pgs.

"U.S. Appl. No. 14/097,892, Final Office Action dated May 20, 2015", 44 pgs.

"U.S. Appl. No. 14/097,892, Non Final Office Action dated Feb. 14, 2014", 47 pgs.

"U.S. Appl. No. 14/097,892, Non Final Office Action dated Jun. 20, 2016", 41 pgs.

"U.S. Appl. No. 14/097,892, Non Final Office Action dated Oct. 8, 2014", 39 pgs.

"U.S. Appl. No. 14/132,293, Advisory Action dated Sep. 19, 2014", 3 pgs.

"U.S. Appl. No. 14/132,293, Examiner Interview Summary dated Apr. 14, 2014", 3 pgs.

"U.S. Appl. No. 14/132,293, Final Office Action dated Apr. 16, 2015", 30 pgs.

"U.S. Appl. No. 14/132,293, Final Office Action dated Jun. 27, 2014", 33 pgs.

"U.S. Appl. No. 14/132,293, Non Final Office Action dated Feb. 26, 2014", 28 pgs.

"U.S. Appl. No. 14/132,293, Non Final Office Action dated Dec. 5, 2014", 22 pgs.

* cited by examiner

DYNAMIC ORDERING OF ONLINE ADVERTISEMENT SOFTWARE STEPS

CROSS-REFERENCE TO RELATED APPLICATIONS

This application is a continuation of and claims benefit under 35 U.S.C. § 120 to U.S. application Ser. No. 14/097,892, filed 5 Dec. 2013 by Ali Dasdan et al., which is herein incorporated by reference for all purposes.

TECHNICAL FIELD OF THE INVENTION

The present invention relates to on-line advertising, and more specifically to managing bids for advertisement placement and the like.

BACKGROUND

In the online advertising environment, advertisers try to market their product to many users by embedding their ads within various online contexts, such as web pages, videos, mobile apps, social networks, and the like. One general purpose of an advertiser is to reach the most receptive on-line audience in the right context at the right time, while minimizing their advertisement budget. The expectation is that the users who have seen these ads in particular contexts will either recognize the brands communicated by the ads or perform a desired action, such as buying an on-line product or clicking on the ad.

Publishers who provide online content to an audience of users often seek to sell advertisement space, referred to as impression opportunities, for displaying ads alongside the content. Bids for purchasing real-time impressions for placement of ads from different advertisers are often negotiated in real-time through real-time bidding (RTB) exchanges.

For each bid request, a high number of ads may be processed in a relatively short amount of time. Circa late 2013, the number of requests received by an ad request processing platform is more than a million per second and the total number of ads can be as high as 6.5 million. These numbers are expected to increase.

SUMMARY OF THE INVENTION

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In general, certain embodiments of the present invention provide mechanisms for bidding on placement of an advertisement within media content that is deliverable within a computer networking environment. In one embodiment that may be implemented at a bid determination platform, an initial sequence having an initial order of a plurality of software steps for filtering advertisements in response to receiving an advertisement bid request is selected. Until a trigger event occurs, the initial sequence of the software steps is implemented in the initial order in response to receiving a plurality of advertisement bid requests. Implementing the initial sequence comprises automatically tracking a failure or success metric and a resource requirement metric for each of the software steps. After the trigger event occurs, a first optimum sequence of the software steps is automatically selected in a first optimum order so as to optimize a total resource usage for execution of the software steps. Selecting the first optimum sequence of the software steps in the first optimum order is based on the tracked failure or success metric and the tracked resource requirement metric for each of the software steps during implementation of the initial sequence.

In a specific implementation, the method further includes implementing the first optimum sequence of the software steps in the first optimum order in response to receiving a second plurality of advertisement bid requests until a second trigger event occurs. Implementing the first optimum sequence comprises automatically tracking a failure or success metric and a resource requirement metric for each of the software steps. In this aspect, after the second trigger event occurs, a second optimum sequence of the software steps is automatically selected in a second optimum order so as to optimize a total resource usage for execution of the software steps, and selecting the second optimum sequence of the software steps in the second optimum order is based on the tracked failure or success metric and the tracked resource requirement metric for each of the software steps during implementation of the first optimum sequence.

In another aspect, optimizing the total resource usage for execution of the software steps includes maximizing a speed at which the software steps filter advertisements for an advertisement bid request. In a further embodiment, the speed at which the software steps filter advertisements for an advertisement bid request is maximized so a maximum number of advertisements are filtered during a beginning portion of execution of the software steps. In another example, optimizing the total resource usage for execution of the software steps includes minimizing a total memory that is used for execution of the software steps. In another aspect, the software steps include a first subset of software steps having a fixed order and a second subset of software steps having an alterable order, and selecting the first optimum sequence of the software steps in the first optimum order includes maintaining the fixed order of the first subset of software steps while altering the second subset of software steps' order.

In another implementation, the tracked failure or success metric for each step is a failure count and the resource requirement metric for each step is a total resource usage, and automatically selecting a first optimum sequence of the software steps in a first optimum order comprises ordering the software steps from a lowest to highest value of a plurality of values that each equal $R_i/F_i$ for each software step i, wherein $R_i$ is the total resource usage for each software step i and $F_i$ is the failure count for each software step i.

In a specific example, the trigger event occurs after expiration of a predefined time period. In another embodiment, the trigger event occurs after execution of a predefined number of implementations of the initial sequence or the software steps. In yet another example, the trigger event occurs after one of the software step's resource requirement metrics or failure or success metrics changes by more than a predefined amount or percentage. In another embodiment, the first optimum order includes a first suborder of a plurality of sub-steps of at least one of the software steps and a second suborder of the software steps. In another embodiment, the software steps includes a plurality of checks for filtering a plurality of advertisements based on a plurality of user characteristics and publisher site characteristics associated with an advertisement bid request meeting a plurality of advertisement campaign constraints associated with each advertisement. In another aspect, automatically tracking a failure or success metric and a resource requirement metric for each of the software steps is performed for a sampling of the total of executions of each software step.

In a specific implementation, automatically tracking a failure or success metric and a resource requirement metric for each of the software steps comprises maintaining a resource counter for each software step's resource usage and a failure counter for each software step's unsuccessful execution. Automatically selecting a first optimum sequence of the software steps in a first optimum order comprises (i) determining a resource requirement for each software step by dividing such software step's resource counter by the number of executions of such software step, (ii) determining a probability of failure of each software step by dividing such software step's failure counter by the number of executions of each software step, and (iii) ordering the software steps from a lowest to highest value of a plurality of values that each equal $r_i/p_i$ for each software step i, wherein $r_i$ is the resource requirement and $p_i$ is the probability of failure for each software step i.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of certain embodiments of the invention and the accompanying figures which illustrate by way of example the principles of the invention.

DETAILED DESCRIPTION OF THE SPECIFIC EMBODIMENTS

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

Introduction

Figure 1:
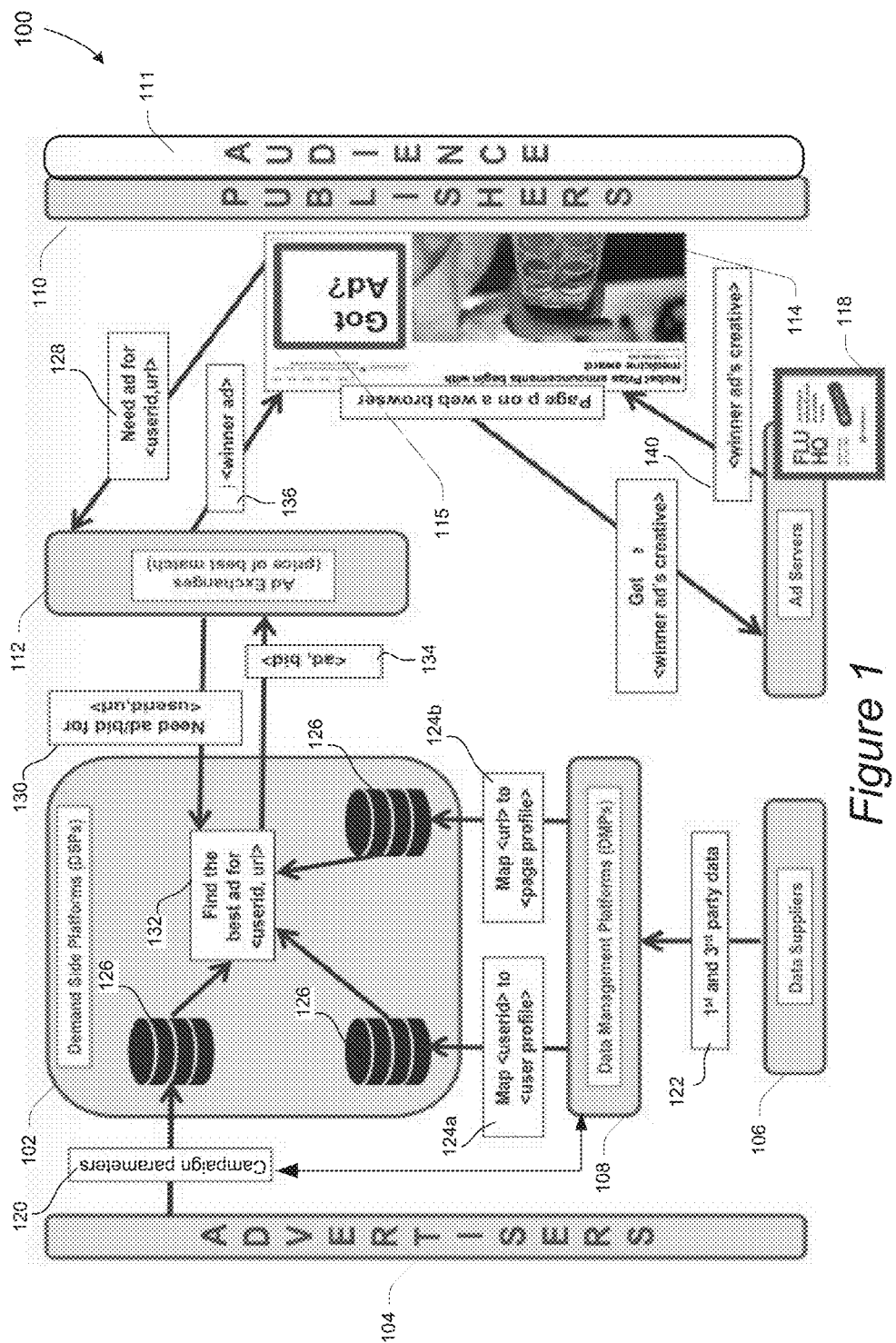
FIG. 1 is a diagrammatic representation of a simplified computer network in which advertisement processes may be implemented.

FIG. 1 is a diagrammatic representation of an example advertisement system in which techniques of the present invention may be implemented. A real-time bidding flow will be first be generally described with respect to this system 100. At a high level, this flow can be considered in three main sections: the demand side on the left, the ad exchange 112 in the middle, and the supply side on the right. In reality, a real-time bidding ecosystem is fairly complex and may include any suitable number and type of components for providing advertisements to audience users.

Publishers 110 may provide any suitable type of displayable, executable, audible, or visual media content to users/audience 111 via a user's device or on the publisher's device or system. For example, media content may include videos, music, text, games, etc. Publishers may provide various categories of content, such as news, entertainment, educational, finance, sports, travel, etc. In a specific implementation, publishers provide media content, such as web pages, from server devices to client devices that are accessible by audience members/users. Example client devices include tablet computing devices, laptop computing devices, personal digital assistant (PDA) devices, mobile phones (e.g., smart phones), desktop computer, televisions, wearable computers, household devices, etc. Each client device may be configured with any suitable hardware and/or software (e.g., browsers and browser add-ins plug-ins, operating systems for downloading and execution of apps on mobile devices) that operates in cooperation with the publisher devices/systems for receiving and presenting media content.

Prior to providing requested media content to users 111, the Publishers 110 may also sell ad spaces with respect to such media content. Advertisers 104 at the demand side have ads to place with publisher-provided media content. In general, what is actually bought (demanded) and sold (supplied) is a tiny fraction of the attention of online users (the audience 111 in the advertising terminology) as they obtain media content from or on publishers' sites. For instance, an advertiser 104 pays to have an ad placed in an ad space of a particular web page that is sold by a publisher. Although the following system 100 and flow is described with respect to ad spaces in web pages, the following processes may be implemented for other types of ad spaces in other types of media, such as mobile device apps, games, coupons, videos, etc.

The ad exchange system 112 generally runs an auction to determine a price of a match between an ad and a web page. In essence, ad exchanges are the markets providing mechanisms for facilitating bidding processes between the demand and supply sides. The ad exchanges may be implemented on any suitable number and type of computing devices.

Demand side platforms (DSPs) 102 may be generally configured to manage advertising campaigns on behalf of advertisers 104 although some advertisers may also work directly with ad exchanges. Given a user requesting a particular web page, a DSP 102 is able to find the best ad for the user (111). The best ad may be selected from the ads managed by the DSP. For each ad selected, various constraints (mostly selected by the advertisers, but some by the ad exchange, the publisher, and the DSP) are met.

DSP D may receive and store user and page profiles in an accessible profile database (such as 126 of FIG. 1), which may be implemented by any suitable type and number of storage devices. The DSPs 102 may obtain the user profile and page profile data from a plurality of data management platforms (DMPs) 108, which may be configured to aggregate and data-mine all kinds of advertising and non-advertising data. One specific use of DMPs is to extend the audience known to an advertiser through analysis of various audience data from various third-party data vendors. DSP D may be integrated with its DMP or other third-party DMPs.

The user and media content profile data may be obtained or accessible as $1^{st}$ and $3^{rd}$ party data (122) from various data suppliers (106), such as first parties (the advertisers themselves) or third parties (independent data suppliers). In the example of FIG. 1, the DSPs 102 obtains mappings between user profile data and user IDs (124a) and mappings between page profile data and universal resource locators or URLs (124b). The user profile data is preferably fully anonymized so as not to contain any personally identifiable information. For instance, a user login, device identity (such as MAC address) may be associated with user profile information, which does not include the user's actual name or address, etc. Similarly, a unique identity for the specific media content (and/or ad space) may be associated with specific characteristics.

Advertisers who work with D may provide campaign parameters or specifications (120) to D. The advertisers may specify any suitable campaign parameters for running a particular ad campaign. For each campaign, an advertiser may specify at least a budget, an ad, a goal, and a set of constraints, sometimes referred to as targeting or contextual constraints. An ad campaign's budget may be specified to be spent over a given time period, sometimes referred to as a budget schedule.

For a branding type campaign, the idea may be to reach as many unique users as the campaign budget affords at a constant cost per impression. This goal may be expressed as CPM, the cost per mille or one thousand impressions. For a performance type campaign, the advertiser may wish to reach as many unique users as the campaign budget affords but to do so while keeping within certain performance goals. The performance goals may be expressed as CPC or CPA, the cost per click or the cost per action or conversion, respectively, although there may be other performance goals depending on the media content type, e.g., cost per engagement for a video advertisement. The goal associated with a segment of users may reflect the value of reaching those users for the advertiser. In advertising terminology, the part of the campaign customized to this segment of users is sometimes called a package. The term CPA may be used herein for both CPA and CPC for brevity and without loss of generality.

An advertiser may also specify targeting constraints for an ad campaign. In general, constraints may specify what kind of users to reach on what kind of media content, how long to run the campaign, etc. A single user constraint can serve to partition a set of users into user segments that include users who satisfy the constraint and users who do not. In general, constraints can be based on any combination of characteristics from a particular user's profile, a particular media content profile, or other parameters that are obtainable for a particular ad request. Example constraints may pertain to user demographics, user browsing history, user geographic location data, media content categories, ad or ad space characteristics, user contextual parameters (e.g., weather, time of day, stock market indexes, etc.), advertiser categories, etc. In general, user contextual parameters may include any contextual parameter that may affect a user or advertiser's behavior.

Referring back to FIG. 1, Publisher P 110 may also work with an ad exchange E 112 to find ads for its pages. When a user u with a user ID <userid> is about to view a web page w 114 with URL <url> from the Publisher P, Publisher P sends an ad request 128 for an ad to be sold for a particular ad space 115 of the web page w 114 to ad exchange E 112. The ad exchange E 112 passes the request 130 to all partner DSPs 102, including D.

Figure 2:
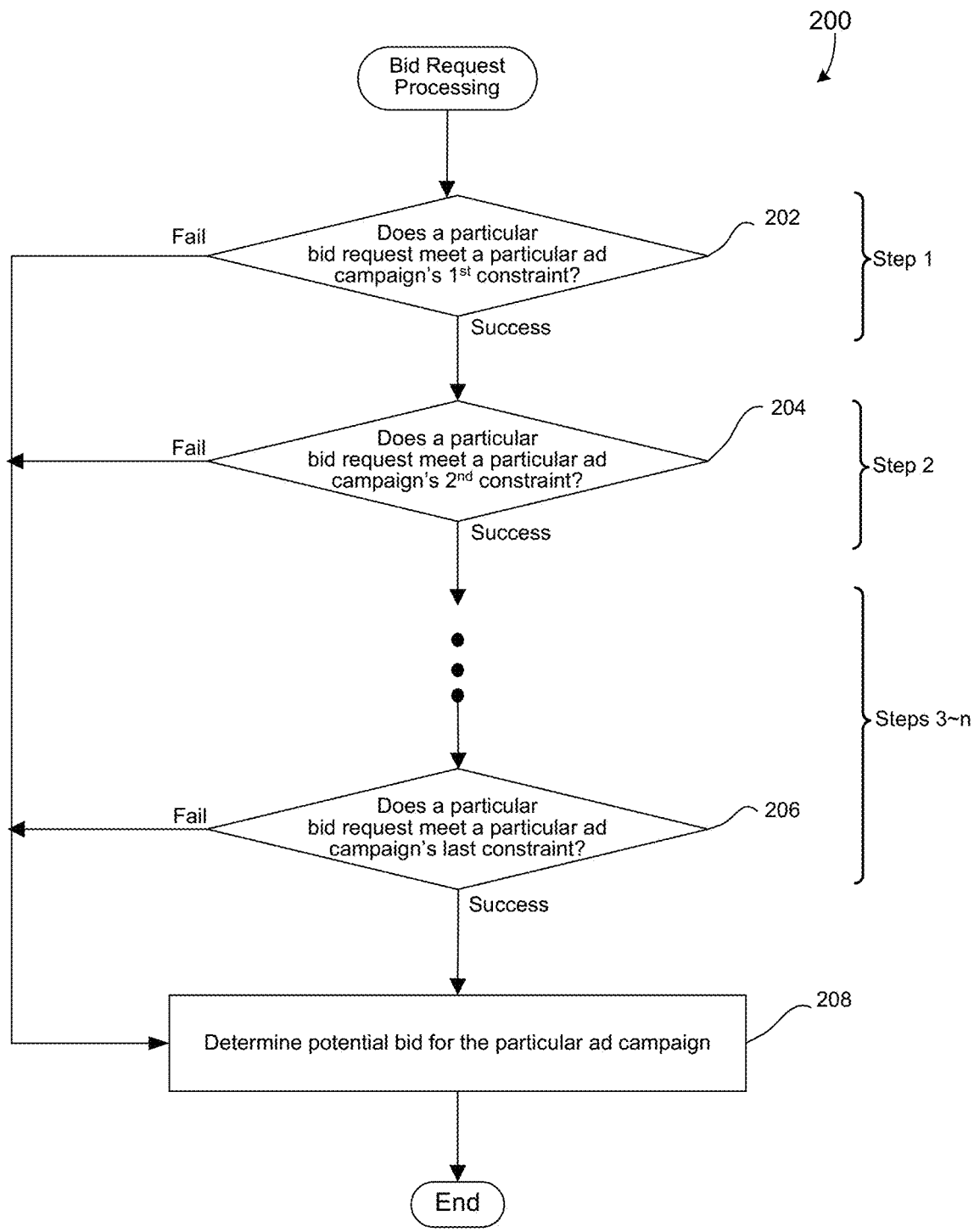
FIG. 2 illustrates a flow chart of a general procedure for handling a bid request with respect to a particular ad campaign.

FIG. 2 illustrates a flow chart of a general procedure 200 for handling a bid request with respect to a particular ad campaign. In a first step (202), it is initially determined whether the particular ad campaign's $1^{st}$ constraint is met. For example, a $1^{st}$ constraint may require that the user, who is associated with the bid request, is in California. If the 1st step check fails, the bid request process 200 for the particular ad campaign ends. If the $1^{st}$ check succeeds, it may then be determined in a $2^{nd}$ step (204) whether the particular ad campaign's $2^{nd}$ constraint is met. For instance, it may be determined whether the publisher's content is identified as pertaining to sports.

A series of steps 3~n may then be checked for success or failure. At any failure point, the process 200 ends and no more checks are performed for the particular ad campaign with respect to the particular bid request. However, if it is determined that the particular ad campaign's last constraint, as well as all previous steps, are met in a last checking step (206), a potential bid may then be determined for the particular ad campaign in operation 208. Each ad campaign's constraints are assessed with respect to the particular bid request as a set of sequence steps so as to filter the ads into a set of ads for which the bid request has passed such ads' constraints. A potential bid is determined for each filtered ad, and the highest potential bid may be sent to the sender of the bid request.

In the illustrated example system, a DSP may perform processing and filtering as a number of steps that are executed sequentially as shown in FIG. 2. Each step can either succeed, in which case the next step is executed, or a particular step can fail, in which case the subsequent steps are skipped. The execution of each step in the sequence also has associated resource requirements (e.g., CPU processing time, memory, I/O) and a probability of failure (e.g., whether the bid request's associated parameters will not pass the particular step's conditional or filtering process). In other embodiments, a probability of success of each step may be tracked.

The total amount of resources needed to perform the steps for handling a bid request is the sum of resources needed by the steps that are actually executed. Of course, steps that are not executed do not contribute to the total amount of resources. Therefore, different orders of sequence steps for determining whether a bid request meets a particular ad campaign's (or each of the ad campaigns') requirements can have different amounts of total resource usage. Additionally, a fixed order of steps can become suboptimal over time, or might not even be optimal at the same time for all systems to which such a fixed order is applied. For instance, resource requirements and probability of failure can change over time or may differ based on hardware, time of day, geographic location, type of application, etc.

Manual tuning of the step order may be very difficult, if not impossible. Manual ordering would have to be done as often as the resource requirements or probability of failure of a step changes and such ordering would probably need to be done per hardware, per application, per location, etc. Such a manual process would also require source code change, which is error prone, and a software restart, which results in service unavailability.

Order Optimization Example Embodiments

Certain embodiments of the present invention provide improved systems and methods for automatically optimizing the order of software steps for handling bid requests so as to minimize resource usage. An automatic step ordering process may be performed without any human intervention, source code alteration, or a software restart. An optimal order may be defined using any particular criteria, such as which sequence order filters ads the most quickly (e.g., uses the least amount of CPU time) or uses the least amount of memory, etc. Alternatively or additionally, the optimum order may have the fastest checks or filter the most ads at the beginning of its sequence (e.g., filter ads more efficiently).

Figure 3:
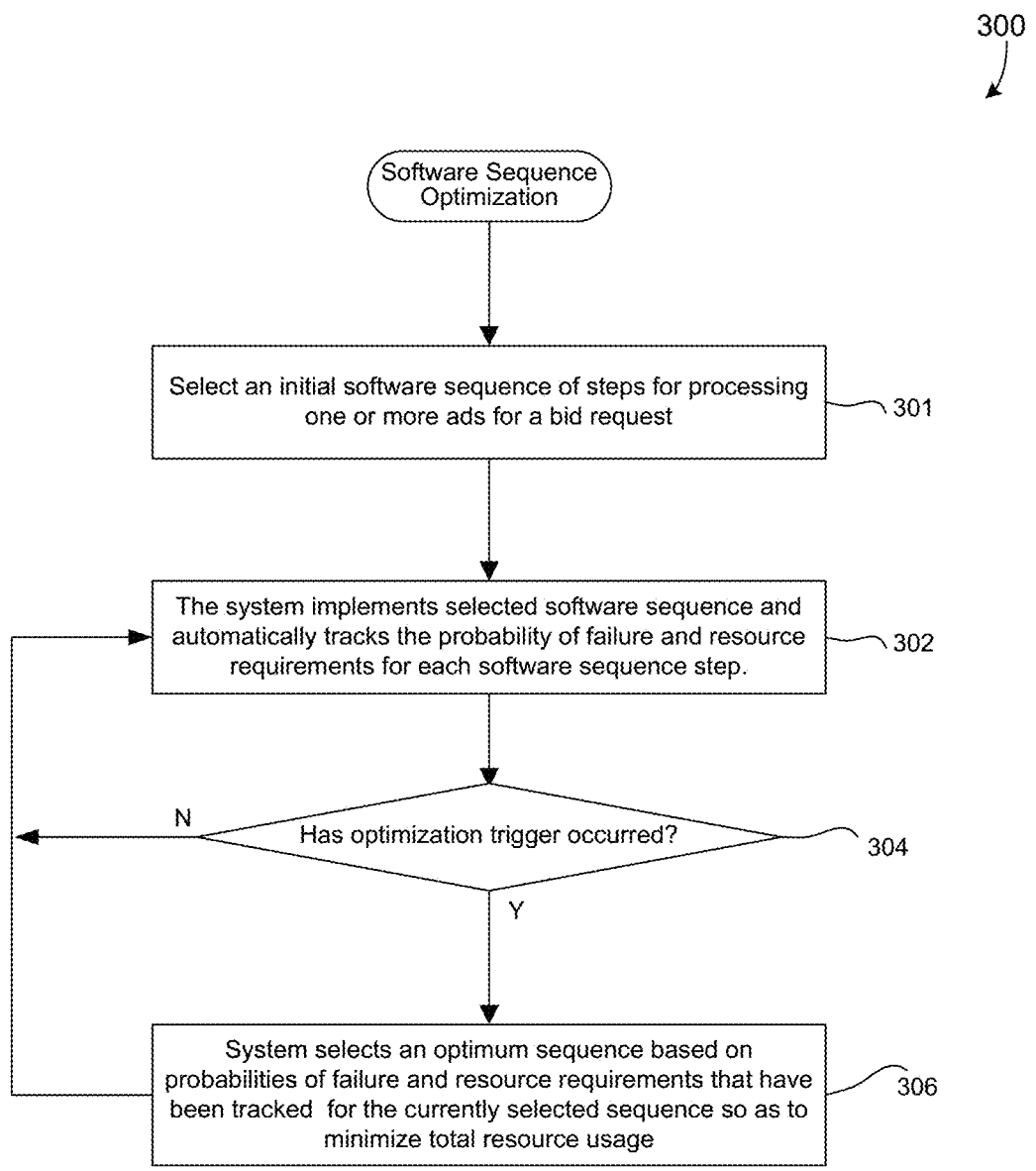
FIG. 3 is a flow chart illustrating a process for optimizing the ordering of software steps for handling a bid request in accordance with one aspect of the present invention.

FIG. 3 is a flow chart illustrating a process 300 for optimizing the ordering of software steps for handling a bid request in accordance with one aspect of the present invention. Although this process 300 (as well as other processes) described herein is shown as a sequence of blocks or operations, one or more blocks may each be implemented by jobs that are run in identical, overlapping, or non-overlapping time frames.

An initial software sequence of steps for processing one or more ads may be selected in operation 301. The initial sequence may be manually selected by a person, such as a DSP administrator, or automatically selected by the system. Selection of the initial sequence may be arbitrary or certain steps may be required to be executed in a particular part of the sequence, such as first or last. That is, the sequence of steps may include fixed steps having an unalterable position within the sequence order.

In one example, a generic initial sequence of steps may be selected for application to all ad campaigns with respect to each bid request. For instance, the initial sequence could include a first step for checking whether the user is from the ad campaign's specified state constraint (if any), a second step for checking whether the publisher site pertains to the ad campaign's subject matter constraint (if specified), and a third step for checking whether the user is a female or male as specified by the particular ad campaign (if any). For instance, an ad may pass a particular check if the bid request meets the ad's specified constraint or the ad does not have a specified constraint for such particular check. In the first step, if the ad campaign does not specify a state for the user, then the bid request user will automatically pass the first step (all user states are allowed).

In an alternative example, different sequences of steps may be selected for different ad campaigns. For instance, a first ad campaign may have a first step for checking whether a user is from California and a second step for checking whether a publisher site pertains to sports, while a second ad campaign has a first step for checking whether a user is from Colorado and second step for checking whether the user is female. Utilizing custom sequences for different ad campaigns is not as efficient as using a generic sequence for multiple ad campaigns.

After an initial sequence is selected, the system can then implement the selected software sequence and automatically track the probability of failure and resource requirements of each software sequence step in operation 302. For ease of discussion, the resource requirements for one execution of the $i^{th}$ step (if such step is executed) may be expressed as $r_i$. The total resource requirements of all executions of the $i^{th}$ step may be expressed as $R_i$. The total number of tries for the $i^{th}$ step may be expressed as $T_i$. The probability that the $i^{th}$ step fails can be expressed as $p_i$. The total number of times the $i^{th}$ step failed may be expressed as $F_i$. The resource requirement $r_i$ and $R_i$ may specify a single type of resource or may incorporate multiple types of resources. If multiple resources with different units of measurements are used, then individual resource values may be normalized to a common scale or weighted score, e.g., percentage of capacity for both CPU and memory usage amount, and added together.

The system may then determine whether an optimization trigger has occurred in operation 304. A trigger for performing an optimization process on a software sequence may occur in any suitable manner. For instance, a trigger may occur after a predefined time period, such as every hour, after a predefined number of sequence or individual step executions, etc. An optimization trigger may also occur during a selected time of each day, a selected day or week, etc. An optimization trigger may also occur after a change in a step's resource requirement $r_i$ or probability of failure $p_i$ is greater than a predefined amount or percentage value. A trigger may also occur if more than a predefined number of steps (e.g., more than half) have changed by any amount or by a predefined amount or percentage value. Sequence optimization may also be triggered when a new step is added to or an existing step is changed or removed from the sequence steps. Other optimization triggers may include hardware changes, increased total system load, new software version, etc.

If an optimization trigger has occurred, the system may then select an optimum sequence based on the probabilities of failure and resource requirements that have been tracked for the currently selected sequence so as to minimize total resource usage in operation 306. The selected optimum sequence may then be implemented in operation 302 until a new optimization trigger occurs in operation 304.

The sequence to be optimized may include all or a portion of the steps for filtering ads for a bid request. For instance, one or more steps of a filtering sequence may have a fixed order, while one or more sequence portions of steps may be optimized to determine an optimum order.

Additionally, an individual step may have sub-steps that may also have an order to be optimized using techniques of the present invention. In a specific example, a step may pertain to geo-partitioning that includes checking state, country, city, zip codes, etc., and the order of these sub-steps may be optimized separately from the overall steps of the filtering sequence. Other example sub-steps may include constraints for defining user segments, such as Boolean logic applied to different user characteristics (e.g., female users who are unmarried who live in United States, but do not live in any Southern states). An order optimization may also be applied to each set of Boolean rules so as to reorder the conditions or sub-rules (e.g., rules for a user's gender, marital status, country, and geographical region) of each set of Boolean logic for user segmenting. In another example of sub-rules, an ad campaign may specify a set of contextual constraints for including or excluding certain types of publisher web sites. That is, contextual constraints may be in the form of inclusion lists and exclusion lists, which are compared to the particular site specified in a bid request, and the inclusion and/or exclusion lists can each contain Boolean logic for assessing different publisher contextual factors. An ordering optimization may also be applied to determining an optimum order of assessing contextual factors in exclusion and/or inclusion lists or determining whether to evaluate an inclusion or exclusion list first.

In further implementation examples, an ordering optimization process may determine which steps to group together as sub-steps within a particular step and their order within such step, as well as the overall sequence order.

In further embodiments, if the optimization process determines that a majority of different orders are similar in their amount of resource usage, optimization may be applied on a finer granularity so that more sub-steps are analyzed and optimized or particular steps are grouped into sub-steps so as to locate new sequences (perhaps with different sub-step groupings) that have lower resource usage.

For a general order optimization process, let C represent the objective function that is to be optimized. In one example, the steps are executed sequentially until one step fails, and the total amount of resources is the sum of resources that are used by the executed steps. In one example for optimizing total resource usage by the executed sequence steps, the function C may be expressed as follows:

$$C = \sum_i r_i \prod_{j=1}^{i-1} (1 - p_j) \qquad \text{Equation [1]}$$

If some of the steps are performed in parallel, the objective function C would vary from Equation [1]. Depending on the definition of the objective function C, the optimum sequence order may be determined using a mathematical procedure. In a simple two step example, steps A and B may be executed in two orders: (i) A→B and (ii) B→A. For the first order (i), the objective function C of Equation [1] equals $r_A+(1-p_A)r_B$. For the second order (ii), C equals $r_B+(1-p_B)r_A$. If the first order (i) results in a better resource usage (lower resource usage) than the second order (ii), the relationship may be expressed as:

$r_A+(1-p_A)r_B<r_B+(1-p_B)r_A$ $p_A r_B < p_B r_A$ $r_A/p_A < r_B/p_B$      Equation [2]

$(R_A/T_A)/(F_A/T_A) < ((R_B/T_B)/(F_B/T_B)$ $R_A/F_A < R_B/F_B$      Equation [3]

Based on Equation [2], the sequence order for the objective function C of Equation [1] may be determined by ordering the terms $r_i/p_i$ for each step from lowest to highest. Based on Equation [3] the sequence order for the objective function C of Equation [1] may also be determined by ordering the terms $R_i/F_i$ for each step from lowest to highest. Ordering the terms $r_i/p_i$ for each step from lowest to highest will result in the same optimum sequence order as ordering the terms $R_i/F_i$ for each step from lowest to highest. In practice, it might be more efficient to order using the terms $R_i/F_i$.

In alternative embodiments, the optimum sequence order may be determined by calculating the objective function C for each possible order and then selecting the best order.

Figure 4:
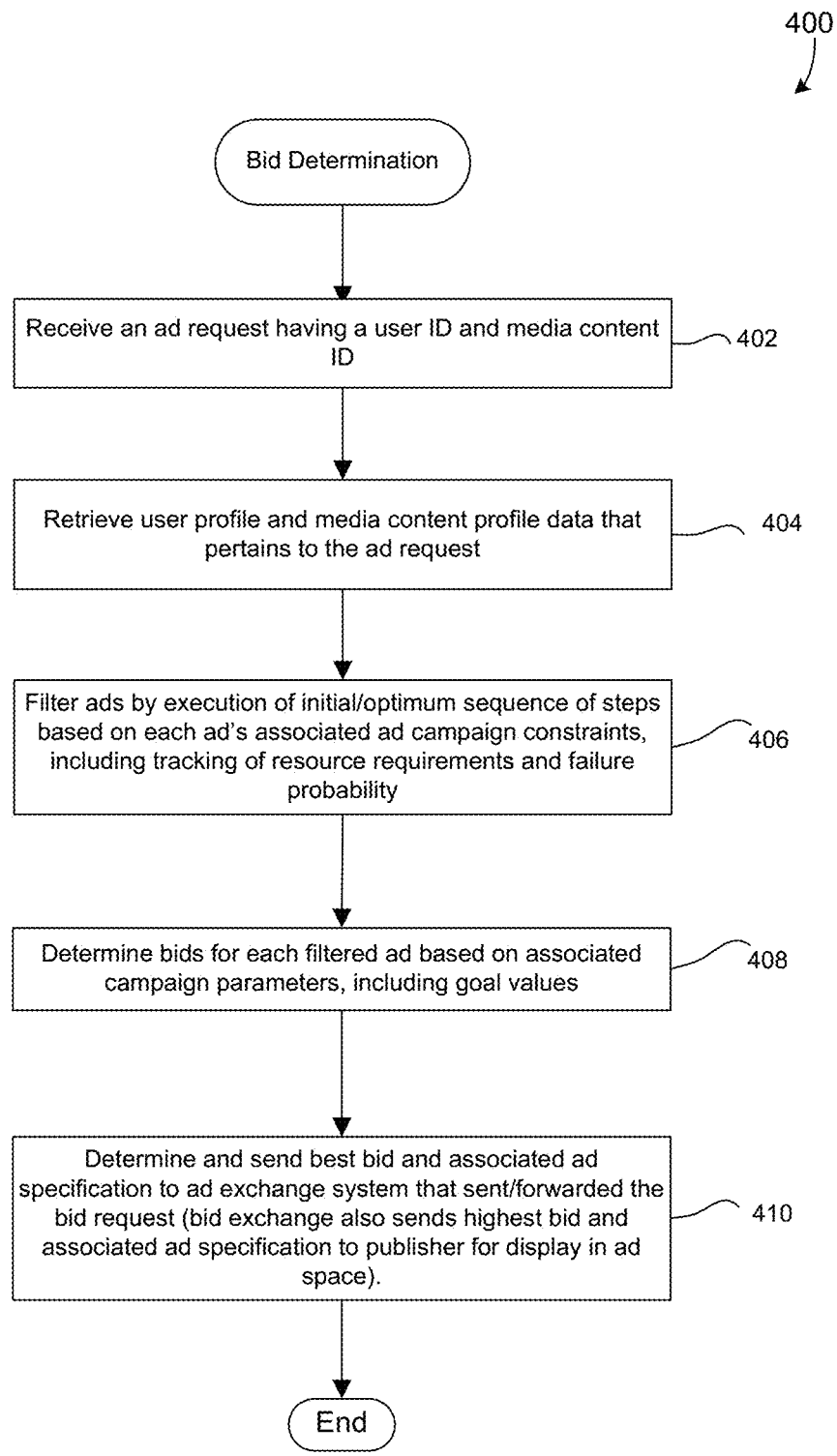
FIG. 4 is a flow chart of a bid determination process in accordance with one embodiment of the present invention.

FIG. 4 is a flow chart of a bid determination process 400 in accordance with one embodiment of the present invention. This bid determination process is described with respect to a single bid request received and handled by a single DSP D. However, it is understood that real-time bidding often involves a large number of bid requests sent by a large number of different publishers to a large number of real-time bid exchange systems and DSPs. For instance, some DSPs can receive and handle more than 1 million bid requests per second.

As shown, an ad request having user ID and media content ID (e.g., u and w) may be initially received (e.g., by DSP D) in operation 402. It is possible that ad requests also contain other information such as IP, user's browser type, etc. The DSP D may then obtain the user and media content profiles that pertain to the received ad request in operation 404. For instance, the DSP D retrieves user and media content profiles (and/or other type of data) that were previously stored and mapped to the user ID and media content ID (u and w), for example, from its profile data stores. Either profile may also be empty if u or w is new to D.

The user profile of user u may include any characteristics that were, are, or can be associated with the particular user u. To protect a user's privacy, user profile data may be stored with an anonymized type of user identifier, such as an arbitrary or randomized identity, rather than the user's actual name, specific residency, or any other type of user identifying information. Examples of user profile data that may have previously been stored for the particular anonymized user u may include demographic data, such as personal or professional interests, employment status, home ownership, knowledge of languages, age, education level, gender, race and/or ethnicity, income, marital status, religion, size of family, field of expertise, residential location (country, state, DMA, etc.), travel location, etc. The user profile data may also include browsing history information, such as pages visited, amount of time per page viewing, links clicked on, searches performed, actions or interactions taken, amount and type of purchases made, etc. The browsing history information may be expressed using any suitable one or more metrics, such as count, absolute or relative value, average, mean, frequency, time duration, etc. The user profile of user u may also include contextual data, such as where the user is currently located, the weather at such location, current events at such location, etc. For instance, the ad request may include a GPS (global positioning satellite) value or access point location for the user u, and other contextual data may be scraped from other databases, such as a weather or entertainment event web site for such location. The media content profile may identify various characteristics of the web page or ad space that is available for purchase, such as one or more content category, ad placement position (e.g., top, side, or bottom of page), ad type (e.g., banner, video, pop-up), etc.

The DSP D may then run various advertisement optimization algorithms (132) to find the best ad for u and w of the bid request. This advertisement optimization may include optimizing for the ads' campaign goals while satisfying constraints. The DSP may work with a variety of advertisers who utilize different campaign types. The campaigns may utilize CPA goals for each package or segment of users or media content. That is, different packages may have a different set of constraints and different constant CPA values. The packages of a particular campaign may have the same ad or a custom ad for the particular segment of users or media content.

The DSP D may filter ads by execution of the initial or determined optimum sequence of steps based on each ad's associated ad constraints in operation 406. For instance, one particular ad constraint specifies that this particular ad only applies to users from California. Accordingly, if the ad request has a user u, who is from Oregon, this particular ad is filtered out from the candidate ads. In contrast, if another ad has an associated constraint specifying users from Oregon, this other ad is not filtered out for the ad request for an Oregon user and such other ad is deemed to be a candidate ad for further bid processing.

Figure 5:
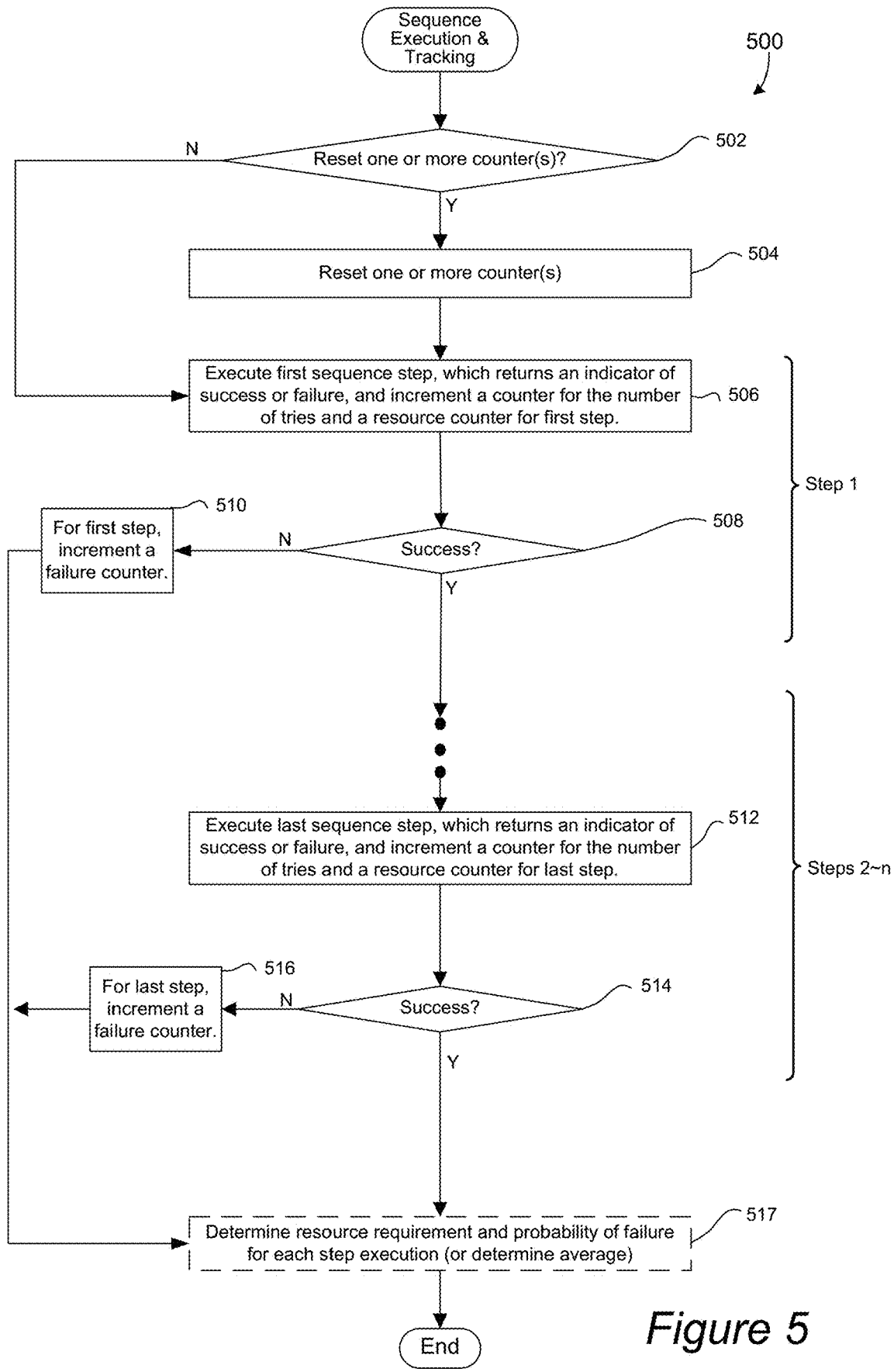
FIG. 5 is a flow chart illustrating a procedure for executing and tracking a software sequence in accordance with a specific implementation of the present invention.

Sequence execution may also include tracking resource requirements and failure probabilities for each ad in operation 406. The tracked resource requirements and failure probabilities may be used to determine a next optimum sequence of steps for processing subsequent bid requests as described above. Any suitable mechanism may be used for tracking resource requirements and failure probabilities for a currently implemented sequence for bid request processing. FIG. 5 is a flow chart illustrating a procedure 500 for executing and tracking a software sequence in accordance with a specific implementation of the present invention. Additionally, the sequence execution and tracking process of FIG. 5 may be performed for each bid request that is processed with respect to each ad campaign.

In the illustrated embodiment, three counters may be maintained for each step. A first counter may be used to track resource usage for each step, while a second counter may be used to track number of failures for each step and a third counter may be used to track the total number of tries for each step. As shown in FIG. 5, it may initially be determined whether one or more counters are to be reset in operation 502. If one or more counters are to be reset, one or more counters are reset in operation 504. Counters may be reset for any suitable purpose, such as resetting periodically to reduce the likelihood that recent variations in resource usage or failure rate is hidden by aggregation of a high number of executions over a long period of time. For instance, a reset may occur after an optimization trigger (as described above).

If no counters are to be reset or after one or more counters are reset, the system may execute a first sequence step, which returns an indicator of success or failure for the first step, and increments a counter for the number of tries and increments a resource counter in operation 506. The resource counter may track the total of resource usage for the executions of the first step that have occurred since the last reset of such counters. Software systems usually provide system calls to measure resource usage, such as CPU, memory, I/O, etc. In the above example, the memory amount and/or CPU usage that is used to check whether the bid request meets each ad campaign's state constraint is added to the resource counter. For instance, the difference between the memory usage prior to performing the first step execution and the memory usage prior to the end of the first step execution. Likewise, the system time for execution of the first step may be determined by querying the system time at the start of the first step and the system time at the end of the first step. The difference between the start and end time represents the system (e.g., CPU) usage time for the first step's execution.

Referring back to FIG. 5, it may then be determined whether the first step is a success in operation 508. If the first step is not a success, a failure counter for the first step may be incremented in operation 510. The failure counter is incremented each time a bid request does not pass the first step's check with respect to a particular ad campaign. For example, if the first step checks whether the bid request meets an ad campaign constraint for user state residence, then a bid request with a California resident user does not pass the first step with respect to all ad campaigns that have a constraint that the bid request's user is from Oregon.

If the first step is a success, the next step is executed. Other steps are sequentially executed until the sequence completes or a step fails. For example, steps 2-n (including last step 512) may be executed and each executed step's counters for number of tries and resource requirement counter are incremented, success determined (e.g., 514), and failure counters incremented for failed steps (e.g., 516).

Although an optimum step order may be determined based on the total resource usage and failure counts for each step over multiple sequence executions (e.g., Equation [3]), an optimum order may also be determined based on resource usage and failure probability for each step's execution (e.g., Equation [2]). Accordingly, the resource requirement and probability of failure for each step execution may optionally be determined in operation 517, which operation may occur at any suitable time, such as the end of the sequence of steps. For example, the resource requirement for each step is the total amount of resource usage for such step divided by the number of executions of such step so as to obtain an estimate of the resource requirement for each step execution. The probability of failure of each step may be determined by the dividing the failure count by the number of tries for such step. These metrics for each step may be determined at the same time (e.g., end of the sequence execution) or at different times (e.g., during or after the different step executions).

In the above example, a resource requirement average (or resource count) and failure probability (or failure count) may be determined for the time period since resetting of the timers. Instead of determining a resource requirement average (or resource count) and failure probability (or failure count) since resetting the counters, these metrics may be determined and maintained for a most recent time period (or last number of tries or executions). For instance, the current total resource usage for a particular step's execution in the last time period is divided by the number of the particular step's executions or tries within such last time period to determine the average resource requirement for the particular step's execution within such last time period. Alternatively, other metrics, such as a median value, deviation values, etc., may be maintained within a particular time frame or set of tries with respect to each step.

The time period that is selected for maintaining a resource requirement average (and/or resource count) and failure probability (and/or failure count) metric (or other metric) depends on the level of desired sensitivity to variation, which can vary with any suitable number and/or type of factors. A shorter time period (e.g., 1 minute) for determining the resource requirement and failure metric will tend to be more sensitive to changes, rather than longer periods (e.g., 1 hour) for determining the average resource requirement and/or probability of failure. For instance, activity and resource usage at night may not be an issue and the sensitivity can be set low so that resource requirement counts or averages are tracked for longer time periods (e.g., can average over entire night) or not at all during the night. During busier times, resource requirements and failure probability may be tracked more precisely to determine smaller changes in resource use or failure probability during shorter time frames (count and/or average over each most recent hour) so that the results are not skewed by less busy periods (e.g., day results are not skewed by the results from the previous night results).

Although the illustrated embodiment shows tracking for each step execution, tracking may occur on a sampling basis, e.g., a counter is not incremented for each step execution. For instance, maintaining counters for each step execution may require too many resources. In one example, the counters for each step are simply incremented 1 every 1000's executions or tries for such step. Any suitable sampling rate may be used for tracking resource usage and failure probability (and/or counts). Additionally, sampling may be performed during particular selected time periods (e.g., day time) and inhibited during other time periods (e.g., at night).

Additionally, different optimum sequence orders may be determined for different types of media channels or market types. For instance, resource usage and failure counts may be tracked per media channel or market, and an optimum sequence order (e.g., of the same software steps) is then determined individually for each media channel or market based on the corresponding resource usage and failure counts that were tracked for each media channel or market.

In other embodiments, an optimum way of implementing a particular step may also be selected from a plurality of different implementations, such as different data structures, based on associated resource usage and failure probability (or counts) for the different implementations. For example, an optimum data structure may be found and implemented for a particular software step based on resource usage and failure probability (or counts) associated with the different data structure implementations.

Certain embodiments of the present invention may facilitate scalability of systems to accept an increasing number of bid requests, advertisements and associated advertisement specifications, and the like. Such scalability can be accomplished while minimizing capital, operational, and software engineering expenditures. In a specific example, certain embodiments of the present invention can lead to a significant reduction in CPU time (or other resource usage) across a large number of associated advertisement servers.

The above-described techniques for determining an optimum order for a sequence of software steps may also be applied to other systems, besides an advertisement bidding system. For instance, a database system may determine an optimum order for joining particular tables or database portions. The intermediate results for joining tables may use different amounts of resources, depending on the order of which tables are joined. In certain embodiment, an optimization process may be implemented to determine the order of which table to join first so as to minimize intermediate results size.

Referring back to overall bid process of FIG. 4, bids may then be determined for each of the filtered ads based on the ad's associated campaign parameters, such as CPA, in operations 408. For an ad having a CPA, the bid b may be computed as:

$$b = p(u; w; a) \times CPA$$

where p(u;w; a) is the probability of action given u, w, the ad a, and optionally other related parameters in the bid computation context. This probability may be computed using any suitable techniques, such as a machine learning algorithm. Several example techniques are described in the paper: D. Agarwal, R. Agrawal, and R. Khanna, "Estimating rates of rare events with multiple hierarchies through scalable log-linear models", ACM SIGKDD Conf. on Knowledge Discovery and Data Mining, 2010, which paper is incorporated herein by reference for providing a technique for determining probability of an actions, such as click or conversion.

Of course, CPA may be replaced with a constant CPC or CPM value (converted to a cost per impression). At least some input for determination of this probability p is provided in the bid request itself. In the CPM example, the bid b is equal to the advertiser specified CPM minus the fees charged by the DSP.

The bid determination techniques described herein may also factor in the corresponding ad campaign or package budget and a specified time frame for such budget to be spent. For instance, if ad purchases for a particular campaign are underspent by more than a predefined amount, the bid amounts may be increased. Likewise, if the ad purchases are overspent by more than another predefined amount, the bid amounts may be decreased. Moreover, a campaign budget can be periodically allocated to different packages of a campaign using an algorithm. The periodic allocation can consider the spend amount and performance levels of each package for allocating more or less budget to these packages.

The bid can be said to be a measure of how much value D puts on this advertisement opportunity. The best bid and its associated ad specifications are found and sent to the ad exchange system, which sent or forwarded the bid request, in operation 410. For example, the DSP D responds back to E with its best bid and information on the corresponding ad 134, specifying how to retrieve the best bid's ad's creative content 118 or 140 (e.g., the actual image corresponding to the ad).

The ad exchange E 112 may run an internal auction using all the bids that are received from DSPs 102 and determine the winning bid and the corresponding ad. The auction may also compute how much the winner DSP (not necessarily D) is to be charged and how much the publisher P 110 is to be paid. The ad exchange E 112 sends the final winning bid and ad specification 136 to Publisher P.

Embodiments of the present invention may be implemented in any suitable network environment. The network may take any suitable form, such as a wide area network or Internet and/or one or more local area networks (LAN's). The network may be in the form of a data, mobile, cellular, plain old telephone network (POTN), or any combination thereof. Referring back to FIG. 1, the network 100 may include any suitable number and type of devices, e.g., routers and switches, for forwarding requests from each client to a particular server application, forwarding application results back to the requesting clients, or forwarding data between various servers or processing devices.

Embodiments of the present invention may also be practiced in a wide variety of network environments including, for example, TCP/IP-based networks (e.g., Rate Control Protocol or RCP, Transport Control Protocol or TCP, Fast TCP, Stream-based TCP/IP or STCP, eXplicit Control Protocol or XCP, etc.), telecommunications networks, wireless networks, mobile networks, etc., or any combination thereof. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be affected or employed at different locations.

The disclosed techniques of the present invention may be implemented in any suitable combination of software and/or hardware system, such as a web-based server or desktop computer system. An apparatus for implementing one or more portions of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Figure 6:
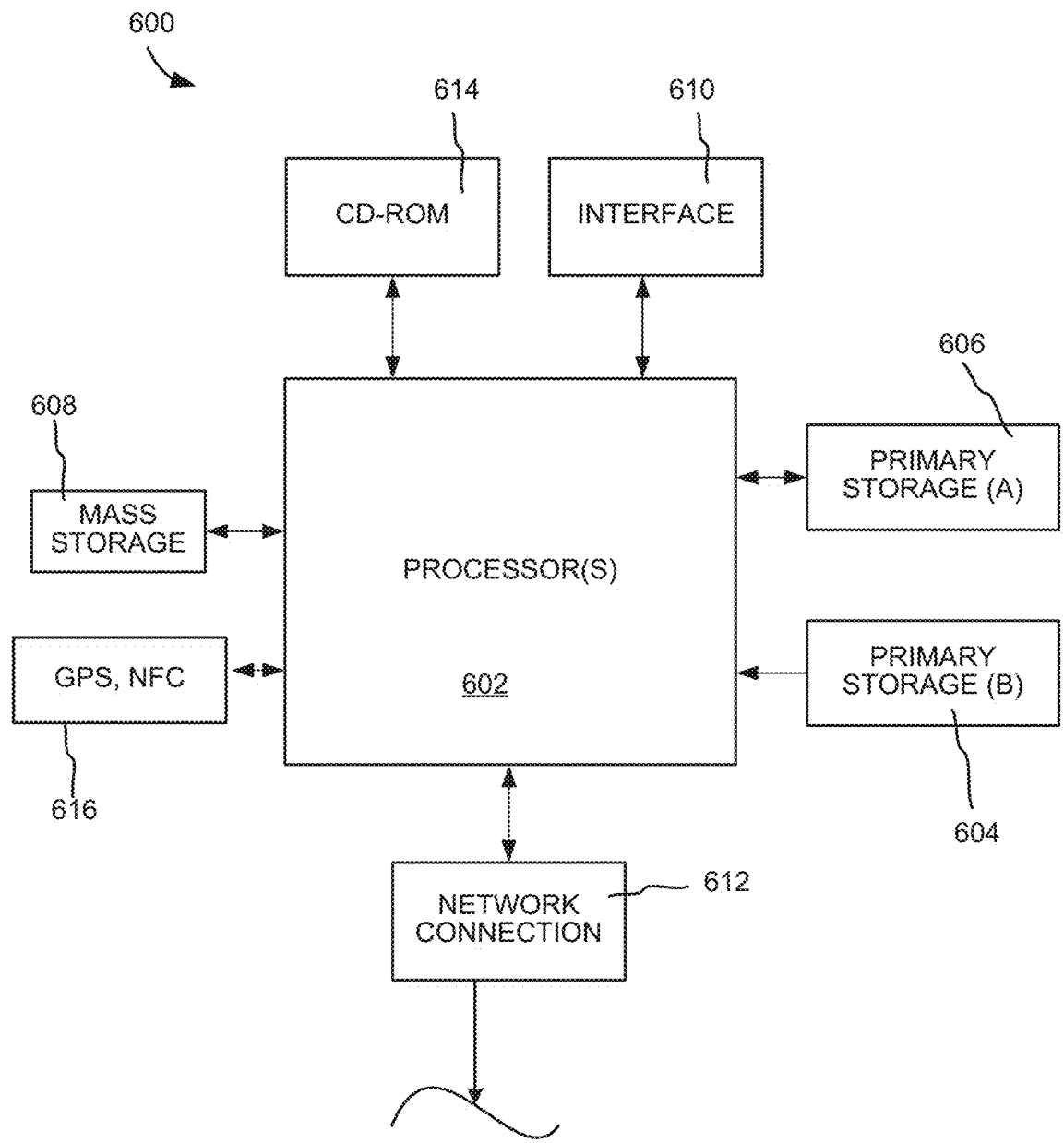
FIG. 6 illustrates a typical computer system that, when appropriately configured or designed, can serve as a system for implementing at least portions of the process embodiments described herein.

FIG. 6 illustrates a typical computer system that, when appropriately configured or designed, can serve as a bid determination system for implementing at least portions of the process embodiments described herein. The computer system 600 includes any number of processors 602 (also referred to as central processing units, or CPUs) that are coupled to storage devices including primary storage 606 (typically a random access memory, or RAM), primary storage 604 (typically a read only memory, or ROM). CPU 602 may be of various types including microcontrollers and microprocessors such as programmable devices (e.g., CPLDs and FPGAs) and unprogrammable devices such as gate array ASICs or general-purpose microprocessors. As is well known in the art, primary storage 604 acts to transfer data and instructions uni-directionally to the CPU and primary storage 606 is used typically to transfer data and instructions in a bi-directional manner. Both of these primary storage devices may include any suitable computer-readable media such as those described herein. A mass storage device 608 is also coupled bi-directionally to CPU 602 and provides additional data storage capacity and may include any of the computer-readable media described herein. Mass storage device 608 may be used to store programs, data and the like and is typically a secondary storage medium such as a hard disk. It will be appreciated that the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 is also coupled to an interface 610 that connects to one or more input/output devices such as such as video monitors or displays, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to an external device such as a database or a computer or telecommunications network using an external connection as shown generally at 612. With such a connection, it is contemplated that the CPU might receive information from the network, or might output information to the network in the course of performing the method steps described herein. CPU 602 may also be coupled with any other suitable internal devices, such as a GPS device or NFC device 616 although these devices may be more applicable to client devices.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

A network may also include mass storage, such as network attached storage (NAS), a storage area network (SAN), or other forms of computer or machine readable storage media, for example. Regardless of the system's configuration (e.g., client or server), it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the present invention relates to machine readable storage media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that are specially configured to store and perform program instructions, such as ROM and RAM. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method for bidding on placement of an advertisement within media content that is deliverable within a computer networking system, the method comprising:
   receiving a plurality of bid requests at a bid determination platform;
   for each received bid request, sequentially executing a plurality of software steps for each of a plurality of advertisements, wherein each software step checks whether specific one or more user characteristics and/or publisher site characteristics associated with the advertisement bid request pass or fail one or more advertisement campaign constraints associated with such advertisement until one of the software steps of such advertisement fails or all of the software steps of such advertisement pass;
   for each advertisement that passes all of the software steps for a particular bid request, determining a bid and sending one or more bids that are determined for one or more advertisements towards a sender device that sent such particular bid request;
   while sequentially executing the software steps for each of the advertisements, automatically maintaining a failure counter for a number of failures for each software step's check;
   while sequentially executing the software steps for each of the advertisements, automatically maintaining a try counter for a number of tries for each software step's check;
   while sequentially executing the software steps for each of the advertisements, automatically maintaining a resource counter for CPU usage time for each software step's check; and
   after a trigger event occurs at the bid determination platform, automatically reordering the software steps for one or more of the advertisements, wherein the software steps for each of the one or more advertisements are reordered to minimize a total CPU usage time for execution of software steps that are likely to fail their checks based on the resource counter, failure counter, and try counter that have been maintained for each software step.

2. The method of claim 1, wherein minimizing the total CPU usage time includes maximizing a speed at which the software steps filter the plurality of advertisement.

3. The method of claim 1, wherein reordering the software steps comprises ordering the software steps from a lowest to highest value of a plurality of values that each equal $R_i/F_i$ for each software step i, wherein $R_i$ is the total resource usage, which includes a total CPU usage time, for each software step i and $F_i$ is the total failure count for each software step i.

4. The method of claim 1, further comprising:
while sequentially executing the software steps for each of the advertisements, automatically maintaining a resource counter for memory used for execution of each software step being applied to the advertisements, wherein reordering the software steps includes minimizing a total memory that is used for execution of the software steps.

5. The method of claim 1, wherein the software steps include a first subset of software steps having a fixed order and a second subset of software steps having an alterable order, and wherein reordering the software steps includes maintaining the fixed order of the first subset of software steps while altering the second subset of software steps' order.

6. The method of claim 1, wherein the trigger event comprises one of the software step's resource counter or failure counter changes by more than a predefined amount or percentage.

7. The method of claim 1, wherein the software steps include a first suborder of a plurality of sub-steps of at least one of the software steps and a second suborder of the software steps.

8. The method of claim 1, wherein reordering the software steps comprises:
determining a resource requirement for each software step by dividing such software step's resource counter value by the number of tries of such software step;
determining a probability of failure of each software step by dividing the number of failures for such software step by the number of tries for each software step; and
ordering the software steps from a lowest to highest value of a plurality of values that each equal $r_i/p_i$ for each software step i, wherein $r_i$ is the resource requirement and $p_i$ is the probability of failure for each software step i.

9. A system for bidding on placement of an advertisement within media content that is deliverable within a computer networking system, the system comprising at least a processor and a memory, wherein the at least one processor and/or memory are configured to perform the following operations:
receiving a plurality of bid requests;
for each received bid request, sequentially executing a plurality of software steps for each of a plurality of advertisements, wherein each software step checks whether specific one or more user characteristics and/or publisher site characteristics associated with the advertisement bid request pass or fail one or more advertisement campaign constraints associated with such advertisement until one of the software steps of such advertisement fails or all of the software steps of such advertisement pass;
for each advertisement that passes all of the software steps for a particular bid request, determining a bid and sending one or more bids that are determined for one or more advertisements towards a sender device that sent such particular bid request;
while sequentially executing the software steps for each of the advertisements, automatically maintaining a failure counter for a number of failures for each software step's check;
while sequentially executing the software steps for each of the advertisements, automatically maintaining a try counter for a number of tries for each software step's check;
while sequentially executing the software steps for each of the advertisements, automatically maintaining a resource counter for CPU usage time for each software step's check; and
after a trigger event occurs, automatically reordering the software steps for one or more of the advertisements, wherein the software steps for each of the one or more advertisements are reordered to minimize a total CPU usage time for execution of software steps that are likely to fail their checks based on the resource counter, failure counter, and try counter that have been maintained for each software step.

10. The system of claim 9, wherein minimizing the total CPU usage time includes maximizing a speed at which the software steps filter the plurality of advertisement.

11. The system of claim 9, wherein reordering the software steps comprises ordering the software steps from a lowest to highest value of a plurality of values that each equal $R_i/F_i$ for each software step i, wherein $R_i$ is the total resource usage, which includes a total CPU usage time, for each software step i and $F_i$ is the total failure count for each software step i.

12. The system of claim 9, wherein the at least one processor and/or memory are configured for:
while sequentially executing the software steps for each of the advertisements, automatically maintaining a resource counter for memory used for execution of each software step being applied to the advertisements, wherein reordering the software steps includes minimizing a total memory that is used for execution of the software steps.

13. The system of claim 9, wherein the software steps include a first subset of software steps having a fixed order and a second subset of software steps having an alterable order, and wherein reordering the software steps includes maintaining the fixed order of the first subset of software steps while altering the second subset of software steps' order.

14. The system of claim 9, wherein the trigger event comprises one of the software step's resource counter or failure counter changes by more than a predefined amount or percentage.

15. The system of claim 9, wherein the software steps include a first suborder of a plurality of sub-steps of at least one of the software steps and a second suborder of the software steps.

16. The system of claim 9, wherein reordering the software steps comprises:
determining a resource requirement for each software step by dividing each software step's resource counter value by the number of tries of such software step;

determining a probability of failure of each software step by dividing the number of failures for such software step by the number of tries for such software step; and ordering the software steps from a lowest to highest value of a plurality of values that each equal $r_i/p_i$ for each software step i, wherein $r_i$ is the resource requirement and $p_i$ is the probability of failure for each software step i.

17. The system of claim 9, wherein automatically maintaining the resource counter, try counter, and failure counter for each of the software steps is performed for a sampling of the total of executions of each software step.

18. At least one non-transitory computer readable storage medium having computer program instructions stored thereon that are arranged to perform the following operations:

receiving a plurality of bid requests at a bid determination platform;

for each received bid request, sequentially executing a plurality of software steps for each of a plurality of advertisements, wherein each software step checks whether specific one or more user characteristics and/or publisher site characteristics associated with the advertisement bid request pass or fail one or more advertisement campaign constraints associated with such advertisement until one of the software steps of such advertisement fails or all of the software steps of such advertisement pass;

for each advertisement that passes all of the software steps for a particular bid request, determining a bid and sending one or more bids that are determined for one or more advertisements towards a sender device that sent such particular bid request;

while sequentially executing the software steps for each of the advertisements, automatically maintaining a failure counter for a number of failures for each software step's check;

while sequentially executing the software steps for each of the advertisements, automatically maintaining a try counter for a number of tries for each software step's check;

while sequentially executing the software steps for each of the advertisements, automatically maintaining a resource counter for CPU usage time for each software step's check; and after a trigger event occurs at the bid determination platform, automatically reordering the software steps for one or more of the advertisements, wherein the software steps for each of the one or more advertisements are reordered to minimize a total CPU usage time for execution of software steps that are likely to fail their checks based on the resource counter, failure counter, and try counter that have been maintained for each software step.

* * * * *